United States Patent
Farmer et al.

(10) Patent No.: US 9,129,313 B1
(45) Date of Patent: Sep. 8, 2015

(54) SYSTEM AND METHOD FOR OPTIMIZING REAL-TIME BIDDING ON ONLINE ADVERTISEMENT PLACEMENTS UTILIZING MIXED PROBABILITY METHODS

(71) Applicant: MaxPoint Interactive, Inc., Morrisville, NC (US)

(72) Inventors: Christopher Farmer, Austin, TX (US); Michael Els, Durham, NC (US); Igor Postelnik, Austin, TX (US); Paul Hodges, Austin, TX (US); Kurt Carlson, Austin, TX (US)

(73) Assignee: MAXPOINT INTERACTIVE, INC., Morrisville, NC (US)

( * ) Notice: Subject to any disclaimer, the term of this patent is extended or adjusted under 35 U.S.C. 154(b) by 28 days.

(21) Appl. No.: 13/672,698

(22) Filed: Nov. 8, 2012

Related U.S. Application Data

(60) Provisional application No. 61/621,379, filed on Apr. 6, 2012.

(51) Int. Cl.
*G06Q 30/02* (2012.01)
(52) U.S. Cl.
CPC .................................. *G06Q 30/0275* (2013.01)
(58) Field of Classification Search
CPC .......... G06Q 30/0275; G06Q 30/0241; G06Q 30/0277; G06Q 30/0244; G06Q 30/06; G06Q 30/08; G06Q 30/0242; G06Q 30/0243; G06Q 30/0276; G06Q 30/0204; G06Q 30/0201; G06Q 30/0202; G06Q 30/0225; G06Q 30/02

USPC .......... 705/14.71, 14.49, 14.43, 14.41, 14.73, 705/14.4, 14.42, 14.72, 26.3, 14.26, 7.33
See application file for complete search history.

(56) References Cited

U.S. PATENT DOCUMENTS

| | | | |
|---|---|---|---|
| 8,234,170 B2 * | 7/2012 | Kassakian et al. | 705/14.71 |
| 8,438,184 B1 * | 5/2013 | Wang et al. | 707/780 |
| 8,554,602 B1 * | 10/2013 | Zohar et al. | 705/7.33 |
| 2003/0110171 A1 * | 6/2003 | Ozer et al. | 707/10 |
| 2003/0149937 A1 * | 8/2003 | McElfresh et al. | 715/517 |
| 2006/0106710 A1 * | 5/2006 | Meek et al. | 705/37 |
| 2007/0174114 A1 | 7/2007 | Bigby et al. | 705/14.52 |

(Continued)

OTHER PUBLICATIONS

Claudia Perlich, Brian Dalessandro, Rod Hook, Ori Stitelman, Troy Raeder, "Bid Optimizing and Inventory Scoring in Targeted Online Advertising", 2012, Media6Degrees.*

(Continued)

*Primary Examiner* — Namrata (Pinky) Boveja
*Assistant Examiner* — Ian C Clarke
(74) *Attorney, Agent, or Firm* — Slayden Grubert Bear PLLC

(57) ABSTRACT

A method and system for optimizing real-time bidding on online advertisement placements is disclosed. According to one embodiment, a computer-implemented method comprises receiving a real-time bidding (RTB) request from a RTB partner who is selling an impression on behalf of a publisher. Several probability scores are predetermined based on various criterion. During the processing of a real-time bid request, a combined probability score and threshold are calculated based on these probability scores. The decision to bid on and price to bid for the impression is determined by the RTB system. Campaign targets are based on the combined probability score. A RTB bid response indicating the selected campaign targets and the bid prices are returned to the RTB partner.

18 Claims, 10 Drawing Sheets

(56) References Cited

U.S. PATENT DOCUMENTS

| | | | |
|---|---|---|---|
| 2008/0243824 A1* | 10/2008 | Riise et al. | 707/5 |
| 2008/0249832 A1 | 10/2008 | Richardson et al. | 705/14.46 |
| 2010/0138271 A1* | 6/2010 | Henkin et al. | 705/10 |
| 2010/0198679 A1 | 8/2010 | Kassakian et al. | 705/14.42 |
| 2011/0040635 A1* | 2/2011 | Simmons et al. | 705/14.71 |
| 2011/0040636 A1* | 2/2011 | Simmons et al. | 705/14.71 |
| 2011/0166942 A1 | 7/2011 | Vassilvitskii et al. | 705/14.71 |
| 2011/0231264 A1* | 9/2011 | Dilling et al. | 705/14.71 |
| 2011/0258036 A1* | 10/2011 | Ioffe et al. | 705/14.43 |
| 2011/0258041 A1* | 10/2011 | Ioffe et al. | 705/14.46 |
| 2011/0258056 A1* | 10/2011 | Ioffe et al. | 705/14.73 |
| 2011/0276392 A1* | 11/2011 | Vaver et al. | 705/14.43 |
| 2012/0041816 A1* | 2/2012 | Buchalter | 705/14.41 |
| 2012/0053991 A1 | 3/2012 | Shimizu et al. | 705/7.34 |
| 2012/0066066 A1* | 3/2012 | Jain et al. | 705/14.58 |
| 2012/0089455 A1* | 4/2012 | Belani et al. | 705/14.44 |
| 2012/0221409 A1 | 8/2012 | Grebeck et al. | 705/14.46 |
| 2012/0245990 A1* | 9/2012 | Agarwal | 705/14.25 |
| 2012/0310729 A1* | 12/2012 | Dalto et al. | 705/14.43 |
| 2013/0066725 A1* | 3/2013 | Umeda | 705/14.66 |
| 2013/0198011 A1* | 8/2013 | Corner et al. | 705/14.71 |
| 2014/0032306 A1* | 1/2014 | Sukornyk et al. | 705/14.43 |
| 2014/0040015 A1* | 2/2014 | Haley et al. | 705/14.45 |

OTHER PUBLICATIONS

United States Non-Final Office Action, U.S. Appl. No. 13/831,252, 25 pages, Apr. 27, 2015.
United States Non-Final Office Action, U.S. Appl. No. 13/831,307, 32 pages, May 12, 2015.

* cited by examiner

SYSTEM AND METHOD FOR OPTIMIZING REAL-TIME BIDDING ON ONLINE ADVERTISEMENT PLACEMENTS UTILIZING MIXED PROBABILITY METHODS

CROSS-REFERENCE TO RELATED APPLICATIONS

This application claims priority to U.S. Provisional Application Ser. No. 61/621,379, entitled "System and Method For Optimizing Real-Time Bidding On Online Advertisement Placements" and filed on Apr. 6, 2012, the disclosure of which is hereby incorporated by reference in its entirety.

FIELD

The present disclosure relates in general to the field of computer software and systems, and in particular, to a system and method for optimizing real-time bidding on online advertisement placements utilizing mixed probability methods.

BACKGROUND

Online advertisement placements generally refer to the slots or space on the pages of a website that are available for displaying advertisements along with its content. Advertisers typically bid on these advertisement placements that are made available through real-time bidding (RTB) exchanges such as AdX, Admeld, Pubmatic, etc.

From a mechanical perspective, this requires the bidding server to have computer hardware linked to the exchanges. The bidding server then receives bid requests via the exchanges. A bid request occurs when a user/internet surfer visits a website/publisher that is selling their ad space on an RTB exchange. Upon receiving a bid request, the bidding server has a very short period of time within to respond to this request (generally around 50-100 ms or less).

Since this bid response needs to occur in a very short period of time, it is difficult to run large scale models to predict what ads to buy and what price to pay for them. We propose methods for creating optimal bid time decisions that allow multiple large data sets to be used in the decision processing in a way that can be acted upon in the time frame required for real-time bidding.

Traditionally, an advertiser manually made simple static rules to be carried out at bid time. The advertiser observed and determined which domains were available on the exchanges. The advertiser selected the domains to bid on by entering them into an excel document. Then, after several days, the advertiser received a report and visually weighs each domain against its click-through-rate ("CTR") to decide if the advertisement performed adequately. The CTR refers to the percentage of times users click on the advertisements given the number of times the advertisements are displayed ("impressions"). The advertiser removed poor performing domains and added new domains. This traditional approach was largely a process of trial and error that relied to a great extent on human memory and human judgment in an effort to meet CTR goals and to ensure enough domains were chosen so that the campaign met the daily impression quota. The traditional approach is more prone to human errors. Furthermore, because all domains were generally bid on with a single static price, advertisers often paid too much for advertisement placements or did not win the more valuable bids.

SUMMARY

A method and system for optimizing real-time bidding on online advertisement placements is disclosed. According to one embodiment, a computer-implemented method comprises receiving a real-time bidding (RTB) request from a RTB partner who is selling an impression on behalf of a publisher. Several probability scores are predetermined based on various criterion (these are relative to the campaigns needs and the features of the bid request). During the processing of a real-time bid request, a combined probability score is calculated based on these probability scores. This is done for each possible target advertising campaign. The decision to bid on the impression is determined by the RTB system. Campaign targets are based on the combined probability score. A RTB bid response indicating the selected campaign targets and the bid prices are returned to the RTB partner The above and other preferred features, including various novel details of implementation and combination of elements, will now be more particularly described with reference to the accompanying drawings and pointed out in the claims. It will be understood that the particular methods and circuits described herein are shown by way of Illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
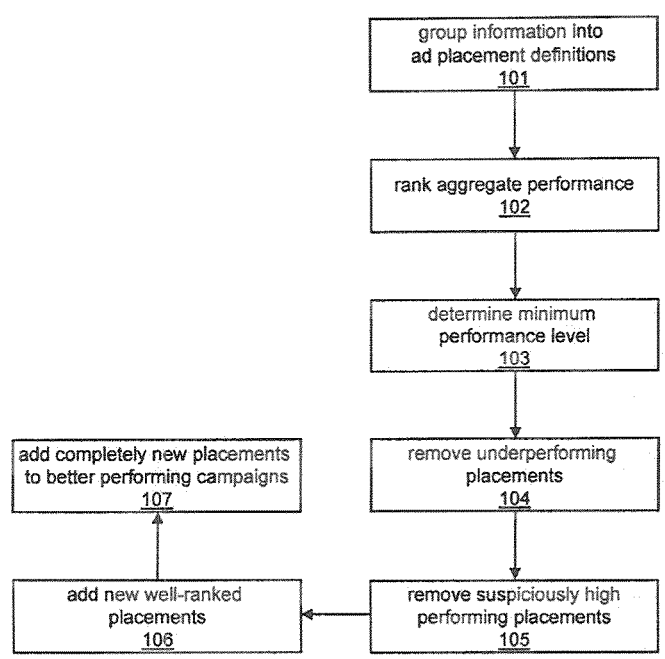
FIG. 1 is a flow-chart that illustrates a process for selecting ad placements based on popularity, according to one embodiment.

The figures are not necessarily drawn to scale and elements of similar structures or functions are generally represented by like reference numerals for illustrative purposes throughout the figures. The figures are only intended to facilitate the description of the various embodiments described herein. The

DETAILED DESCRIPTION

A method and system for optimizing real-time bidding on online advertisement placements is disclosed. According to one embodiment, a computer-implemented method comprises receiving a real-time bidding (RTB) request from an RTB partner for placing an online advertisement campaign. Multiple probability scores are predetermined based on various criterions for each possible campaign and made available to the RTB bidding system. During the processing of a real-time bid request, a joint probability score is calculated based on two or more input probability scores for each possible campaign. Campaign targets are selected based on the combined probability score, a bid price, and a campaign threshold. An RTB bid response indicating the selected target campaigns and the bid prices are returned to the RTB partner to participate in the auction.

The present system and method allows advertisers to automatically and smartly bid on advertisement requests on RTB exchanges in an optimal manner while reaching a target goal of an advertising campaign. Moreover, the present system determines how best to buy advertisement placements in an RTB environment in a manner that maximizes the campaign goals at market efficient prices and that meets the required impression quota. Campaign goals may take the form of a particular demographic audience, a desired CTR, a desired cost per click, a video view rate, a number of online purchases/actions, a desired cost per purchase/action, offline sales, or maximize the rate at which any target event occurs.

Defining Advertisement Placements

Typically, the number of unique ad requests that are found in an RTB is in the order of billions. In an effort to efficiently manage the massive amount of information on RTB exchanges, it is advantageous to create a structure to classify the billions of unique advertisement placements (or "ad placements") into fewer, optimizable components.

Figure 8:
FIG. 8 illustrates an example of an ad placement, according to one embodiment.

According to one embodiment, ad placements may be grouped by segments. For instance, an ad placement may be defined using the following structure: {RTB exchange, Domain, Segment1, Segment2, . . . , SegmentN, Ad Size, Ad position}. To illustrate, consider the ad placement shown in FIG. 8 for the web address http://www.foxnews.com/politics/2012/03/07/justice-department-threatens-apple-publishers-with-lawsuits-over-alleged-e-book/. Applying this structure, the ad placement may be defined as follows:

Exchange: AdX
Domain: foxnews.com
Segment1: politics
Segment2: 2012
Segment3: 03
Segment4: 07
Segment5: justice-department-threatens-apple-publishers-with-lawsuits-over-alleged-e-book
Ad Size: 728×90
Ad Position: Above the fold Grouping advertisement placements into different ad segments allows probabilistic statements to be made because probabilistic statements require a sample. Observing and evaluating individual URLs as placements by themselves does not allow easily for statements regarding what works according to any metric. By grouping URLs together into advertisement placements, useful statistical inferences are made.

Statistically, the rarer an event, a larger sample size is needed to accurately measure its efficacy. Campaign goals (metrics) are rare events that vary greatly. An ad placement should be defined in such a way that the sample size is sufficiently large to make probabilistic statements. For instance, consider CTR goals for display and video ads. Because clicks are a much rarer event on display ads than they are on video ads (e.g., 0.1% vs 2% CTRs on average), the above ad placement may be defined more broadly for a display campaign:

Exchange: AdX
Domain: foxnews.com
Ad Size: 728×90
Ad Position: Above the fold

While for a video campaign, the above ad placement may be defined more narrowly:

Exchange: AdX
Domain: foxnews.com
Segment1: politics
Segment2: 2012
Ad Size: video ad
Ad Position: Above the fold Thus, defining an ad placement may include the number of impressions that have been served on the placement, and how rare are the occurrences of the event that is being optimized. Generally, the more information that is available for an ad placement or the more common the occurrences of an event are, the more granularly the ad placement may be defined. Ad placements may be defined or redefined on the fly for every campaign and every performance metric.

The end result is a dynamic dataset that evolves as ads are served. This dataset is unique and dynamically changes every time the data is processed. It groups URLs into placements as granularly as it can, while still retaining sufficient information for inference. The granularity depends on:

the efficacy of the placement. The higher the success rate, the fewer impressions are needed for inference.

the similarity of the placement. If the placement performs on par with those around it, then it does not get broken out into a separate placement. Those placements that perform above or below the expectation get broken into different placements.

Placement Recommendation

After defining the ad placement set for each campaign, the next step is to rank all the ad placements for each campaign given knowledge of all placement performance across all known campaigns (e.g., previous and on-going campaigns).

FIG. 1 is a flow-chart that illustrates a process for selecting ad placements based on popularity, according to one embodiment. Starting at 101, the impression and various other forms of information from all known campaigns are grouped together into ad placement definitions. Other forms of information may, for instance, include cross campaign placement comparisons that reveal whether certain ad sizes are more effective than others. It may also include domain categories that are used to manipulate rankings and to help the system learn whether some content categories consistently outperform others.

The ad placements are then ranked based on their aggregate performance across all the previous campaigns. At 102, all ad placements served within each campaign are ranked. At 103, minimum and maximum desired performance levels for the ad placements for each on-going or currently-active campaign are determined. Thus, each campaign is associated with its own minimum and maximum levels. At 104, ad placements from each on-going campaign that do not meet a minimum performance level are removed. At 105, ad placements that have suspiciously high performance metrics are also removed as they may be indicative of non-human activity, such as those performed by spiders/crawlers that generate fake clicks. At 106, new ad placements are added to each on-going campaign based on their aggregate performance rank (determined at 101). At 107, some proportion of placements that are completely new to the system (e.g., no performance information from previous campaigns) may be added to the better performing, on-going campaigns. This allows the learning of performance information regarding speculative ad placements.

In addition to the selection process illustrated in FIG. 1, each campaign may be associated with specified "white lists" or "black lists" that may affect the ranking of ad placements. A white list may refer to a list of domains that are adequate for ad placements. This could be a list from a client, an internal list, or a list based on domain categories. A black list may refer to a list of sites that are excluded from the server because they that have deemed undesirable for a campaign. These lists may be applied to all optimizations.

Figure 2:
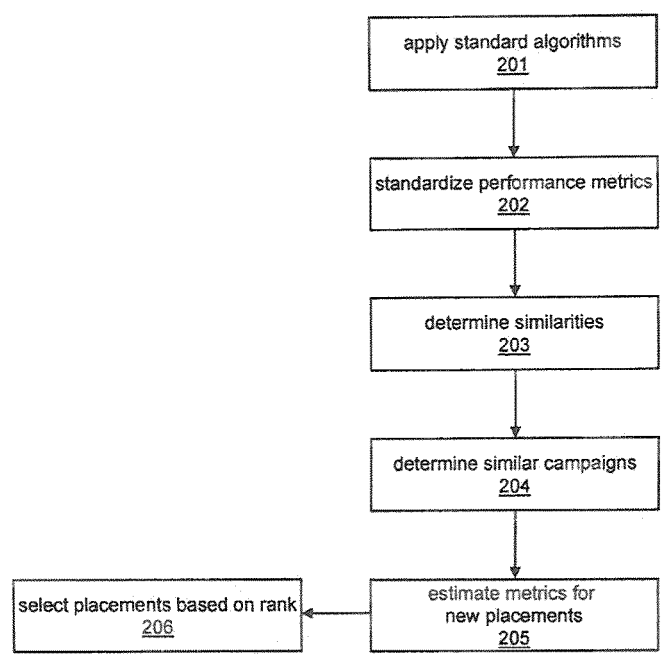
FIG. 2 is a flow-chart that illustrates an exemplary collaborative filtering process for selecting ad placements, according to one embodiment.

While the process of FIG. 1 selects ad placements based on their performance/popularity, a collaborative filtering process is also contemplated (this is not restricted to collaborative filtering, any matrix factorization or other recommendation technique is implied throughout the document where "collaborative filtering" is used). FIG. 2 is a flow-chart that illustrates an exemplary collaborative filtering process for selecting ad placements, according to one embodiment. Starting at 201, the performance of each ad placement is determined based on standard user-based recommendation (e.g., each campaign is treated as a user and each ad placement is treated as an item). At 202, the performance metrics are standardized for each campaign. At 203, Pearson (or other) similarity measures may be used to determine which campaigns are similar based on how they performed on like placements with like performance metrics. At 204, for each campaign, a number of other campaigns (e.g., 10) that are most similar to it are determined. Then, at 205, performance metrics for new placements may be estimated based on a weighted average of how similar campaigns performed on those placements. The weights may be based on how similar the other campaign is to the campaign of interest and how many impressions were served to each placement, and how certain the system is that the observed performance metric resembles the truth. Finally, at 206, the desired ad placements for a campaign may be selected based on their rank (e.g., based on weighted scores of observed performance or from performance scores of similar campaigns for each placement) and estimated performance metrics.

Figure 3:
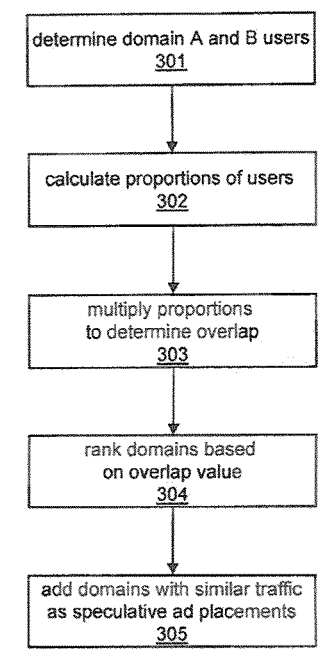
FIG. 3 is a flow-chart that illustrates an ad placement selection process based on similar user traffic, according to one embodiment.

In addition to the selection processes of FIGS. 1 and 2, it may also be desirable to select ad placements that are similar to top rated ad placements through similar user traffic. FIG. 3 is a flow-chart that illustrates an ad placement selection process based on similar user traffic, according to one embodiment. Starting at 301, users which have visited domain A (e.g., domain with top rated ad placements) and users which have visited domain B are determined. At 302, the proportion of users that visited domain A that also visited domain B is calculated $$\left(\text{e.g.,}\ \frac{A \cap B}{B}\right).$$

Similarly, the proportion of users that visited domain B that also visited domain A is calculated $$\left(\text{e.g.,}\ \frac{A \cap B}{A}\right).$$

At 303, these two values are multiplied together to define a similarity measure that equals "1" if the audience for both domains is exactly the same and "0" if domains A and B have no overlapping users. Using this measure, at 304, all other domains are ranked by how similar they are in terms of users to the top performing domain for any campaign. At 305, domains with similar traffic to a top performing domain are added as speculative ad placements. These ad placements may be biased towards the low volume domains because generally they will have a more precise audience.

Although the processes illustrated by FIGS. 1-3 have been described independently, it is contemplated that they may be used in combination with one another, such as in a tiered system, to facilitate the selection of ad placements for campaigns. Another process that may be applied to further facilitate the selection of ad placements is feature comparison across ad sizes, domain categories (e.g., news, sport, entertainment, technology, etc.), and campaign categories (e.g., Auto, CPG, insurance, etc.).

Figure 4:
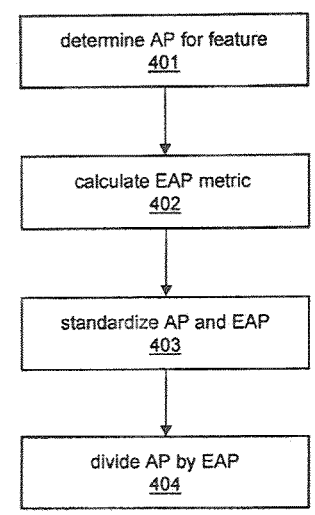
FIG. 4 is a flow-chart that illustrates an exemplary process for feature comparison for ad size categories, according to one embodiment.

FIG. 4 is a flow-chart that illustrates an exemplary process for feature comparison for ad size categories, according to one embodiment. Starting at 401, the aggregate performance ("AP") of ad placements by ad size is determined for a given campaign. At 402, the expected aggregate performance ("EAP") for each ad size across all other campaigns is calculated. The expected aggregate performance provides a measure of how it should have performed. At 403, both the values AP and EAP, found in 401 and 402, respectively, are standardized so that they are directly comparable. Finally, at 404, by taking the standardized AP value and dividing by the standardized EAP value, the system measures the difference between the actual performance by ad size and the expected performance. For instance, a value of "1" indicates that it is performing as expected and a value of "1.2" indicates that the ad size is performing 20% better than expect. The ad size is sent in the bid request. It represents the size of the ad slot available on the given URL.

While the above process of FIG. 4 is illustrated with respect to ad size comparison, it can be applied across any feature set. The result may also be averaged across all feature sets, for instance, to an adjustment centered around "1." The results may further be averaged by placement and multiplied by the estimated rating from the user-based recommender model of FIG. 2 to get an updated score estimate.

One issue that may be associated with selecting ad placements is a cold start problem. This problem refers to the situation in which campaign performance information over several ad placements may be unavailable for making an accurate recommendation for ad placement. One method to resolve this issue is to use item popularity to create a starting list. Another method is to pick the top N placements from all campaigns to ensure a good mix of placements and allow a campaign to select the best neighborhood of similar campaigns as fast as possible. Additionally, feature information based on campaign category may also be included. For instance, if the new campaign is an insurance-based campaign, placements which worked best for other insurance-based campaigns may be determined. This may be accomplished using the same methods as described above without providing similarity data, but rather grouping campaigns or taking the top N placements out of a category. A mixture of these methods may be applied to help solve the cold start problem.

Digital Zip/User Targeting

Another aspect of the present system and method is grouping Internet Protocols (IPs) and IP ranges into clusters based on geographic location known as Digital Zips (DZs). This allows the optimization of DZs or IPs based on some performance metric, similar to how ad placements are optimized as described above. For instance, in the optimization of DZs or IPs, each DZ is treated as an item and each campaign as a user. This allows the system to use a similar user-based collaborative filtering approach described above. Furthermore, a similarity technique similar to the technique illustrated in FIG. 3 may be applied to find new DZs that are similar to good performing DZs based on traffic patterns.

DZ information can be layered and adjusted for spatial correlation using formal spatial models. When targeting areas to serve advertisements, a small subset of available DZs may be chosen instead of all the available DZs. This allows the identification of DZs in the subset that perform well. Geographic neighbors to DZs that perform well are also more likely to perform well. Using standard spatial models such as the spatial Durbin model (SDM), spatial error model (SEM), spatial autoregressive model (SAR), conditional autoregressive model (CAR) and K-nearest neighbours methods, campaign performance may be estimated across the entire geographic space that are of interest for serving. Such standard spatial models include spatial Durbin model (SDM), spatial error model (SEM), spatial autoregressive model (SAR), conditional autoregressive model (CAR), and K-nearest neighbors methods. This way new DZs may be better selected, and poor performers may be thrown out.

This method can easily be combined with the user-based method. For example, performance correlations of each DZ may be estimated, standardized around "1," and then multiplied by the estimate score.

Price Optimization

Another aspect of the present system and method is price optimization. The RTB environment generally operates using a second price auction system. Ad placements have a clear price distribution around them and often have a price floor that moves over time. There is also a yearly price drift whereby placements increase in price over the year. There are also several cyclical components that occur within the year that affect all placements or some subset of placements (e.g. public holidays affect all placements while political events affect news and political placements only).

By looking at winning prices and win rates for placements that have been bid on, the present system estimates a price distribution that the market follows. The present system also estimates the price drift of this distribution over time.

Having estimated this distributional information, the system determines tradeoffs between lowering price and bid wins (impression volume). If the system observes that it is one of the highest bidders for an ad placement, then the system can lower its bid price substantially, lose marginal volume and have large decreases in the price paid. By doing this at scale across all placements, the system targets a desired win rate and given cost tailored to campaign volume, performance, and cost needs. The system determines tradeoffs between winning bid price and volume. It is based on a pricing algorithm that will be detailed in another patent.

When there are lots of available impressions for a given placement, the system can strategically move down the price curve and maintain the same level of performance by effectively only buying the cheapest ads needed to meet the campaign's goals for that particular ad placement. Under some circumstances we have much more ad placements are available for purchase than we would like. Under these circumstances we can strategically buy the cheapest ones impressions within all ad placements and thus maintain performance and impressions spread across the same number of placements. In this case, the system strategically buys the cheaper ads (at a lower price and thus lower win rate) while maintaining the performance.

In a given auction, there might be only one bidder. For all auctions there is also an unknown and randomly changing price floor. Under these circumstances, the winning bid is set by the only bidder, and the present system exploits and targets placements by lowering the bid price until it reaches the current price floor. If it starts to lose all the time, it will raise price again. This applies when there is only one bidder in a given auction. Under some circumstances we can predict quite accurately when this is the case. When we are the only bidder, we would to find out what bid price reaches the cheapest win price (price floor). This holds performance and win rate constant while decreasing the cost significantly.

Pacing Optimization

Another aspect of the present system and method is pacing optimization. One of the significant challenges of achieving good campaign performance is correct pacing (hitting the daily impression/volume goal). Correct pacing also refers to using as few placements as possible so that only the very best placements are used. An optimal situation is where ads are served every minute of the day so that by the last minute of the day, the last few impressions that are needed to hit that day's impression quota/goal are being served.

One method for pacing optimization is to observe how many impressions a campaign served, how many placements it used, and which hours of the day it served. Because very different impression volumes occur every hour of the day, the system normalizes these numbers to estimate a placement velocity. Placement velocity refers to the average number of impressions that a placement will see throughout the day for a given campaign with a static set of DZs and a known point in the price distribution. Based on the number of impressions needed in the day, the system uses placement velocity to estimate the number placements needed to reach that goal.

Another method for pacing optimization may offer better pacing control from a mechanical point view because some campaigns run with hourly impression quotas that aim to meet a day's impression quota. To maximize the minutes served in the day, the system estimates the number of placements to assign a campaign for the day. Now, under this embodiment, the system estimates the number of impressions to allocate to each hour so as to fill each hour of the day. This is done by iteratively moving impression quota from hours that do not meet their quota to hours that meet their quota too quickly.

Yet another method for pacing optimization is to this is dynamically change the number of placements that are bid on periodically to adjust for volume fluctuations throughout the day.

According to another embodiment, the present system re-weights hours to bias impressions towards better performing hours. To ensure smooth serving throughout the day, the system assigns more placements to better performing hours compared to poorer performing hours. Each hour of the day performs equally well. In other words, for hours that perform well, the system selects below average performing ad placements as they will now perform adequately. Whereas for poor performing hours, the system drops some better placements as they will perform below what is needed. The system can perform this process for the optimization of DZs, as well.

Mixed Optimization

Another aspect of the present system and method is to apply some or all of the optimization methods discussed above simultaneously instead of in a tiered process in order to achieve a target performance metric at an efficient price point. As an example, the system provides a clear measure of how effective each placement, DZ and hour is. The system creates a final score that is, for instance, a function of placement, DZ and hour.

The core idea here is that there are K dimensions for optimizing performance (e.g. placement, time, DZ, demographics/audience attributes, etc.). The system is able to score each dimension alone. The extension of mixed optimization is (for each bid request) to estimate 1 score that jointly considers all other scores. Thus, it is some function F(score1, score2, ..., scoreK).

According to one embodiment, the system computes a multiplicative score where each dimension is centered around 1. If the system (e.g., during a bid on an RTB exchange) identifies a DZ having a score of 1.5, an ad placement having a score of 1.2, and an hour having a score of 0.8, the final score for a bid request would be 1.44. If the system is targeting bid requests with a score greater than 1, the system would bid on this item. If too few impressions are being won, the system may increase the bid price to some maximum acceptable point, or lower the target score iteratively until impressions are won at the desired rate to meet that daily impression quota.

According to one embodiment, the system provides an opportunity for bidders to consider or buy a rather poor performing placement that would never previously have been considered. The system allows the bidders to place ads in a prime hour in the high performing DZ, thus provides more choices to bid with an improved performance.

Binomial Estimation for Eliminating Placements

As mentioned earlier grouping advertisement placements into different ad segments allows probabilistic statements to be made because probabilistic statements require a sample. One of the questions is then how large of a sample is required to make a probabilistic statement statistically significant? For instance, if X clicks are observed given Y impressions for an ad placement, how confident can the system be that the ad placement is performing above a target CTR ("tCTR")?

It has been observed that clicks can be modeled fairly accurately under a binomial assumption. That is, the probability p of an impression being clicked by a user is the same for each impression in the same set of impressions. Under the binomial assumption and setting p=tCTR, the probability P(oCTR>tCTR) that the observed CTR ("oCTR") is greater than the target CTR (e.g., outperforming target CTR) is:

$$P(oCTR > tCTR) = \sum_{i=k}^{n} \frac{n!}{(n-i)!i!}(p^i)((1-p)^{n-i}) \quad \text{(equation 1)}$$

Where n equals the number of observed impressions and k equals the number of observed clicks.

To ensure that the observed CTR is large enough to support, for instance, at least a 20% confidence level (p-value) that the observed CTR is outperforming the target CTR for a given number of impressions n, what would k need to be? To solve for k using the above expression takes significant computational resources. One way less computationally intensive way to solve for k is to implement a look up table. However, given that k would have to be calculated for thousands and may be millions of ad placements, implementing lookup tables may still not be the most practical solution.

Figure 5:
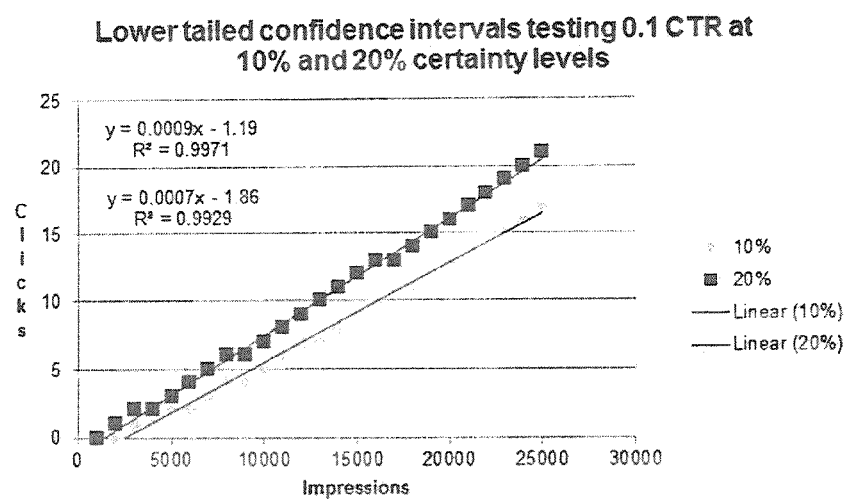
FIG. 5 illustrates a linear relationship for confidence levels 10% and 20% with target CTR=0.1%, according to one embodiment.

The present system and method provides a solution for estimating k that requires significantly less computational resources. The solution is based on the observation that the number of observed clicks k for a given confidence level exhibits a linear relationship with respect to the number of impressions n. FIG. 5 illustrates this linear relationship for confidence levels 10% and 20% with tCTR=0.1%, according to one embodiment.

Figure 6:
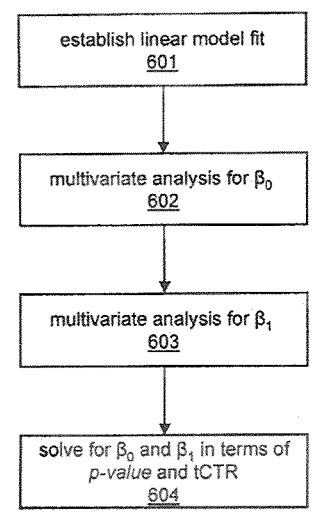
FIG. 6 illustrates a flow-chart of an exemplary process for estimating k, number of observed clicks for a given confidence level, according to one embodiment.

FIG. 6 illustrates a flow chart of an exemplary process for estimating k, number of observed clicks for a given confidence level, according to one embodiment. Starting at step 601, a linear model fit is established using data points calculated based on equation 1 above. The linear model fit yields of $\beta_0$ and $\beta_1$ coefficients. At step 602, a multivariate regression analysis is performed on the $\beta_0$ coefficient where the p-value and the tCTR are the explanation variables. More $\beta_0$ coefficient values for the analysis may be calculated by varying p-value=P(oCTR>tCTR) and p=tCTR values and repeating step 601 to yield a set of $\beta_0$ and $\beta_1$ coefficients. Similarly, at step 603, a multivariate regression analysis is performed on the $\beta_1$ coefficient where the p-value and the tCTR are the explanation variables using the set of $\beta_1$ coefficients already calculated at step 602. Finally, at step 604, $\beta_0$ and $\beta_1$ coefficients are solved for in terms of p-value and tCTR and plugged back into the linear model fit found at step 601.

The description above encompassing FIGS. 5 and 6 illustrates one example according to one embodiment. The description illustrates that, in general, it is possible to define and approximate a four-dimensional space {p-value, CTR, impressions, clicks} or in terms of binomial theory {p-value, p, trials, successes}. Rather than using the discrete binomial equation to solve for confidence intervals, it is possible to approximate that four-dimensional space with a series of linear equations. When three of the four components of that space are known, it becomes a simple multiplication problem. The result being that, given a desired minimum target CTR, a level of confidence that is adequate, and the number of impressions served, it is possible to determine the minimum number of clicks needed for that target CTR to be true or better with simple multiplication operations. This result can be used to decide with some reasonable certainty that the system should stop bidding on a given placement since its performance is likely to be less than what is expected for that campaign. At this point it would be better to start fresh bidding on a completely new placement chosen from the previously mentioned estimation/recommendation system.

Mixed Optimization

So far, methods have been described for ranking and/or scoring multiple features of a bid request individually (i.e. placement, DZ, time, etc). Rather than creating a static bidding rule set for each of these features separately, we propose a joint/mixed scoring method.

The present mixed optimization technique achieves optimization by taking into consideration a set of multiple probabilities. For a given target campaign, the probability $P_{DZ}$ of a DZ match and the probability $P_P$ of a placement match are calculated, respectively. A performance probability $P_h$ for each hour is also calculated for the campaign. The performance probability indicates how well an hour of the day performs for a campaign. A base price for each placement is calculated and stored. Other probabilities could be added to the set to calculate the optimized result. The mathematical model to calculate these probabilities and the amount of data being processed may be limited by the computing power of the system since it needs to be done at bid time. By calculating these probabilities/scores for all campaign and bid request features before a buying opportunity is presented, it allows the system to determine in real-time whether to buy an impression utilizing a joint probability/score by combining the individual scores that represent meaningful and condensed information from very large datasets.

These probabilities are combined to determine the fitness of an impression for an advertising campaign. The bid price is also factored into the fitness calculation. A function, $F(P_{DZ}, P_P, P_h,$ base price, campaign, campaign threshold, ..., featureK)=(Bid Price, Score) is used to determine both the overall impression fitness score as well as the bid price. The impression fitness score may be calculated using various techniques, for example, a multiplicative score or by using an average. The end result is that every bid request entering the real-time bidding system gets a score based on fit for every active campaign.

From the earlier section on pacing, every campaign gets an impression quota for the day which is spread across the day. To control pacing for a campaign, the system sets an initial threshold level per campaign. The threshold tells the real time bidding system to only bid on requests that score above the threshold. The system periodically checks to see whether it is on track to hit its daily quota for every campaign. If for one campaign it is approaching the quota too quickly, then it raises the threshold for that campaign thus reducing the number of bids made by the real-time bidding system. Similarly, if a campaign is approaching its impression quota too slowly, then it will lower its threshold for that campaign thus increasing the number of bids made by the real-time bidding system.

According to one embodiment, the absolute difference value between the minimum and the maximum probabilities is checked against a set of boundary conditions. This way, the system rules out an impression that has a high score in one probability and a low score in another probability. In addition, the system allows the bidder to adjust the bid price based on the combined score and pay more or less depending on how well the impression matches the campaign. This allows the RTB system to scale impression price to performance as well as try out speculative inventory without paying a full price. The combined score also allows the system to bias bids to campaigns that have a higher combined score in the event that multiple campaigns match an impression. By adjusting a campaign's score threshold, other aspects of the campaign, such as pacing (that is impression delivery over time) are adjusted accordingly to maintain campaign performance. The moving of a campaign's score threshold up or down decreases or increases the possible number of impressions that the campaign is eligible to bid on and win.

If multiple campaigns are eligible to bid on a bid request after the fitness score has been calculated and campaign thresholds applied, then the fitness score can be used to determine the best campaign to select and respond with for that bid request. In one example the fitness score values are ranked with only the top scoring campaigns selected. In another example the top scoring campaign set is inspected to select the ones with that have the lowest price or have the greatest impression needs.

Figure 7:
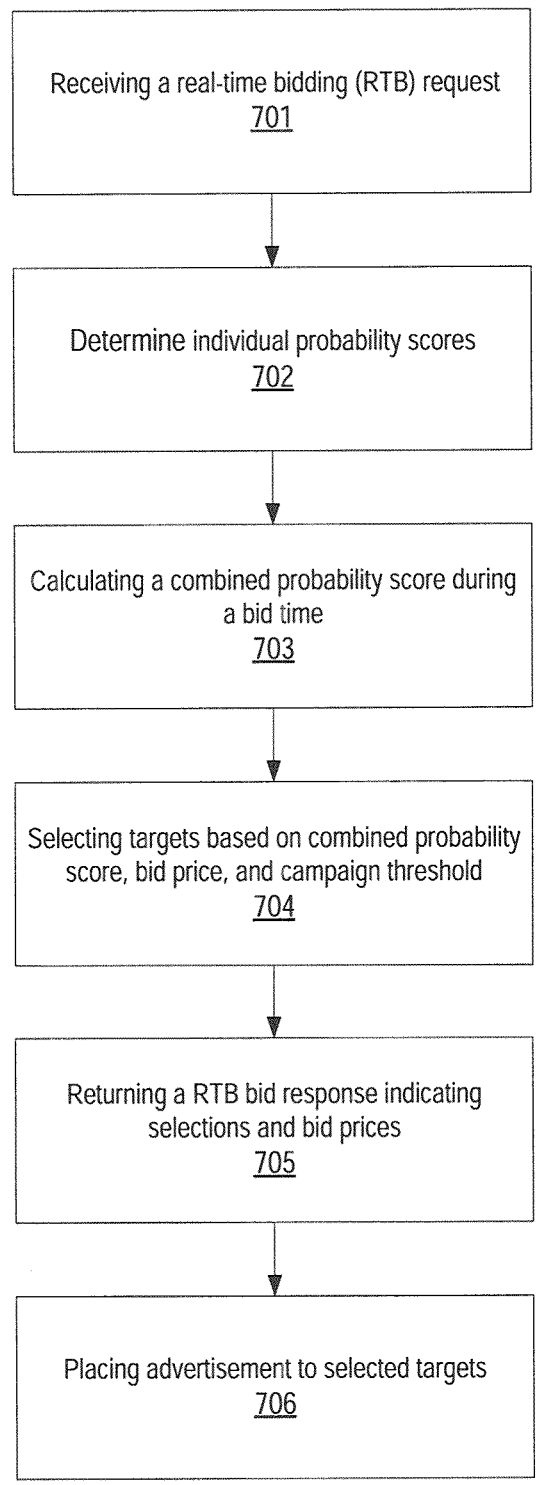
FIG. 7 illustrates a flow-chart of an exemplary process for calculating a combined score, according to one embodiment.

FIG. 7 illustrates a flow-chart of an exemplary process for calculating a combined score, according to one embodiment. An RTB bidding system receives a real-time bidding (RTB) request (701). An RTB request may be made from a RTB partner or directly from a publisher who has impressions to sell the advertiser. The RTB system retrieves individual probability scores for placing the online advertisement campaign based on each criterion needed by the function F( )(702). The joint probability score is calculated by a function F( ) based on different criteria. For example, the probability scores include $P_{DZ}$ of a DZ match, $P_P$ of a placement match, and $P_h$ of each hour. During RTB bid time, i.e., when an impression is presented for sale, the RTB system calculates a combined probability score using the function F( )(703). The RTB system selects campaign targets for placing an impression based on the combined probability score, the bid price, and the campaign threshold (704). The RTB system finally selects one or more campaigns to attempt to acquire the impression for, and returns a RTB bid response that indicates selections and bid prices. (705). When the bidding is successful, the RTB system places the impression of the winning campaign (706).

Figure 9:
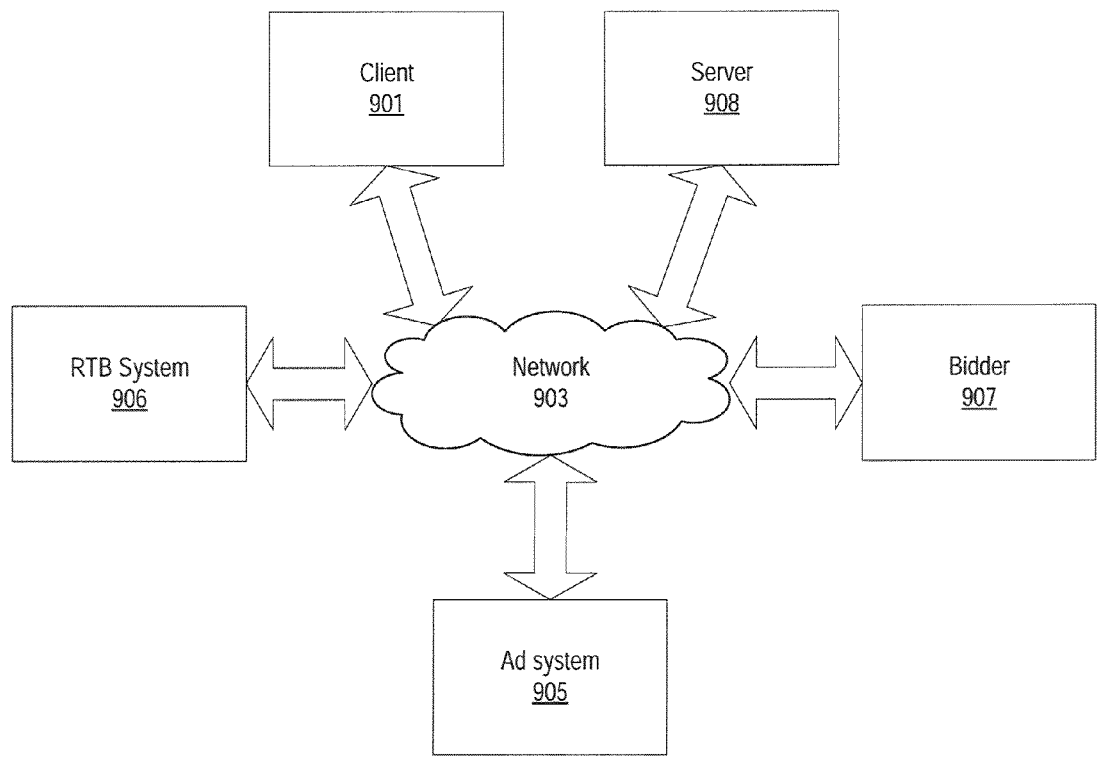
FIG. 9 illustrates an exemplary system level architecture for use with the present system, according to one embodiment.

FIG. 9 illustrates an exemplary system level architecture for use with the present system, according to one embodiment. A client 901 having a browser views a webpage hosted by a server 908. An RTB system 906 receives biddings from one or more bidders 907. Bidders 907 and/or ad systems 905 can select an appropriate advertisement and place the selected advertisement to the client 901 on a webpage of the server 908.

Figure 10:
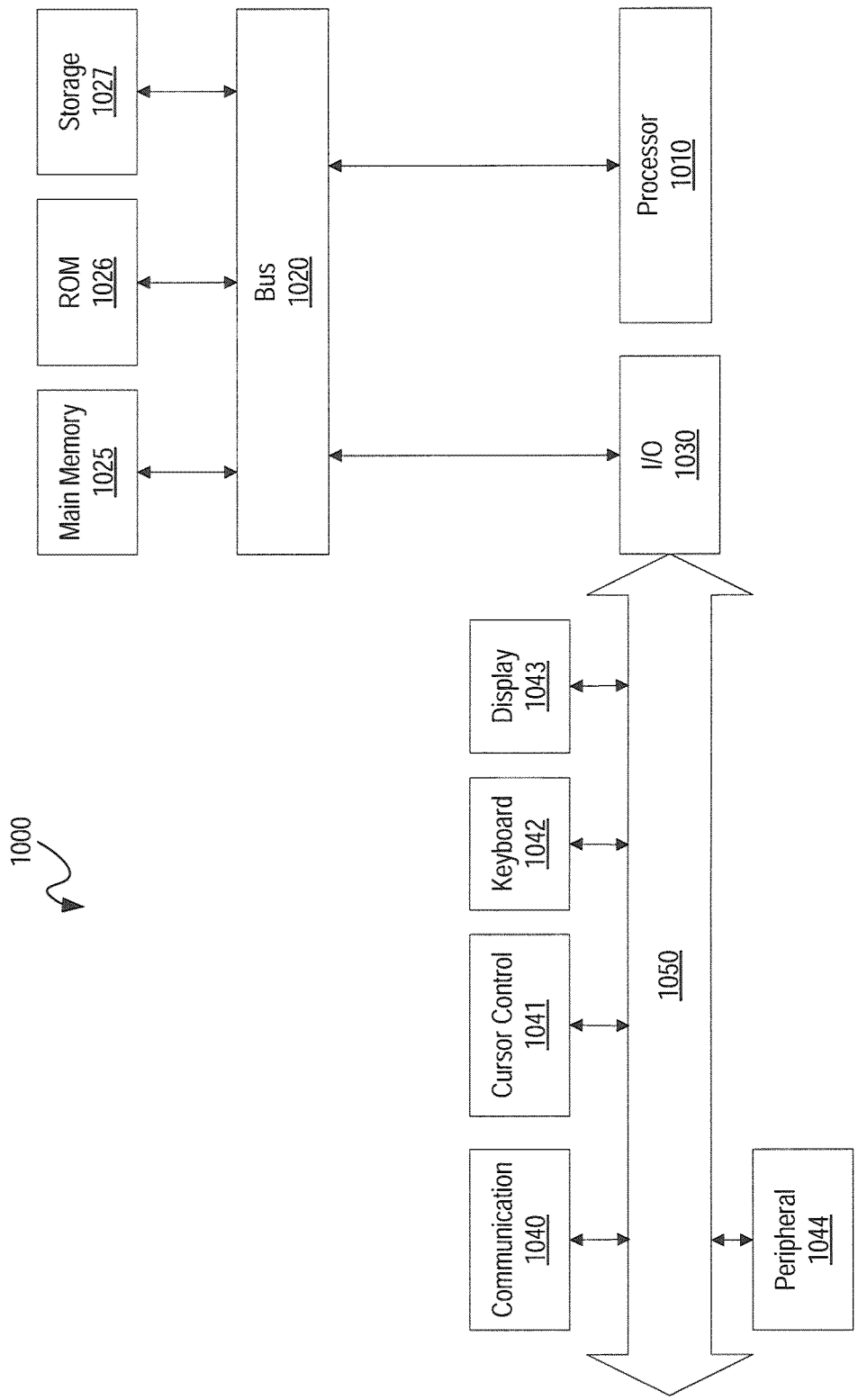
FIG. 10 illustrates an exemplary computer architecture that may be used for the present system, according to one embodiment.

FIG. 10 illustrates an exemplary computer architecture that may be used for the present system, according to one embodiment. The exemplary computer architecture may used for implementing one or more components described in the present disclosure including, but not limited to, the present system. One embodiment of architecture 1000 comprises a system bus 1020 for communicating information, and a processor 1010 coupled to bus 1020 for processing information. Architecture 1000 further comprises a random access memory (RAM) 1021 (referred to herein as main memory) or other dynamic storage device 1025, coupled to bus 1020 for storing information and instructions to be executed by processor 1010. Main memory 1025 also may be used for storing temporary variables or other intermediate information during execution of instructions by processor 1010. Architecture 1000 may also include a read only memory (ROM) and/or other static storage device 1026 coupled to bus 1020 for storing static information and instructions used by processor 1010.

A data storage device 1025 such as a magnetic disk or optical disc and its corresponding drive may also be coupled to architecture 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 allows for access to other computers (e.g., servers or clients) via a network. The communication device 1040 may comprise one or more modems, network interface cards, wireless network interfaces or other interface devices, such as those used for coupling to Ethernet, token ring, or other types of networks.

A system and method for optimizing real-time bidding on online advertisement placements has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method performed by a real-time bidding (RTB) bidding system including a processor and instructions stored in non-transitory computer-readable media and executable by the processor, the method comprising:

determining by the processor a set of probability scores corresponding to a plurality of bid request parameters related to online advertisement bid requests based on a set of criteria for an online advertisement campaign for purchasing online advertisements via RTB auctions managed by an RTB exchange, wherein the set of probability scores includes, for each bid request parameter, a range of probability scores indicating a respective desirability of different values for that bid request parameter with respect to the online advertisement campaign;

during the online advertisement campaign, receiving at the processor via a communications network an RTB bid request from the RTB exchange for an online advertisement placement associated with an internet webpage being loaded remotely by a web browser, the RTB bid request having associated values for one or more bid request parameters, and in real time during the loading of the webpage, the processor:

calculating, during the processing of the received RTB bid request, a combined probability score based on the values for the one or more bid request parameters associated with the RTB bid request and the set of probability scores;

determining whether to bid on the online advertisement placement associated with the RTB bid request based at least on the calculated combined probability score and a campaign threshold associated with the online advertisement campaign; and in response to determining to bid on the online advertisement placement associated with the RTB bid request, returning from the processor to the RTB exchange an RTB bid response for inclusion in an RTB auction completed during the loading of the webpage;

wherein the set of probability scores are calculated prior to receiving the RTB bid request to facilitate the real-time execution of the determination of whether to bid on the online advertisement placement associated with the RTB bid request.

2. The computer-implemented method of claim 1, wherein the set of probability scores including at least one of (a) user-targeting probability scores based on a geographic location associated with the respective bid request, (b) advertisement placement probability scores related to an advertisement placement associated with the respective bid request, and performance probability scores related to a time associated with the respective bid request.

3. The computer-implemented method of claim 2, wherein multiple probability scores associated with the received RTB bid request are combined to calculate a final joint probability score for the received RTB bid request.

4. The computer-implemented method of claim 1, further comprising:

receiving an impression quota from an advertiser; and determining whether the impression quota has been met based on a number of bids won for the online advertisement campaign.

5. The computer-implemented method of claim 4, further comprising:

if the impression quota has not been met or met too quickly:

adjusting the bid price; and determining target campaigns based on the adjusted bid price.

6. The computer-implemented method of claim 5, further comprising:

if the impression quota has not been met or met too quickly:

adjusting the campaign threshold; and determining target online advertisement campaigns based on the adjusted campaign threshold.

7. The computer-implemented method of claim 6, further comprising:

if multiple online advertisement campaigns are eligible to bid on the received RTB bid request, applying a set of rules to select a particular online advertisement campaign to bid on that RTB bid request.

8. A non-transitory computer readable medium having stored thereon computer-readable instructions, which instructions when executed by a processor cause the processor to perform operations comprising:

determining a set of probability scores corresponding to a plurality of bid request parameters related to online advertisement bid requests based on a set of criteria;

wherein the set of probability scores includes, for each bid request parameter, a range of probability scores indicating a respective desirability of different values for that bid request parameter with respect to the online advertisement campaign;

during the online advertisement campaign, receiving via a communications network an RTB bid request from an RTB exchange for an online advertisement placement associated with an internet webpage being loaded remotely by a web browser, the RTB bid request having associated values for one or more bid request parameters;

in real time during the loading of the webpage, the processor:

calculating during the processing of the received RTB bid request, a combined probability score based on the values for the one or more bid request parameters associated with the RTB bid request and the set of probability scores;

determining by the processor whether to bid on the online advertisement placement associated with the RTB bid request based at least on the calculated combined probability score and a campaign threshold associated with the online advertisement campaign; and in response to determining to bid on the online advertisement placement associated with the RTB bid request, returning from the processor to the RTB exchange partner an RTB bid response for inclusion in an RTB auction completed during the loading of the webpage;

wherein the set of probability scores are calculated prior to receiving the RTB bid request to facilitate the real-time execution of the determination of whether to bid on the online advertisement placement associated with the RTB bid request.

9. The non-transitory computer readable medium of claim 8, wherein the set of probability scores including at least one of (a) user-targeting probability scores based on a geographic location associated with the respective bid request, (b) advertisement placement probability scores related to an advertisement placement associated with the respective bid request, and performance probability scores related to a time associated with the respective bid request.

10. The non-transitory computer readable medium of claim 9, wherein the multiple probability scores associated with the received RTB bid request are combined to calculate a final joint probability score for the received RTB bid request.

11. The non-transitory computer readable medium of claim 8 having further instructions stored thereon, which instructions when executed by the processor cause the processor to perform operations comprising:

receiving an impression quota from an advertiser; and
determining whether the impression quota has been met based on a number of placements of the online advertisement campaign.

12. The non-transitory computer readable medium of claim 11, having further instructions stored thereon, which instructions when executed by the processor cause the processor to perform operations comprising:
adjusting the bid price; and
determining targets based on the adjusted bid price.

13. The non-transitory computer readable medium of claim 12, having further instructions stored thereon, which instructions when executed by the processor cause the processor to perform operations comprising:
adjusting the campaign threshold; and
determining targets based on the adjusted campaign threshold.

14. The non-transitory computer readable medium of claim 13, having further instructions stored thereon, which instructions when executed by the processor cause the processor to perform operations comprising:
when multiple online advertisement campaigns are eligible to bid on the received RTB bid request, applying a set of rules to select a particular online advertisement campaign to bid on the RTB bid request.

15. A computer-implemented method performed by a real-time bidding (RTB) bidding system including at least one processor and instructions stored in non-transitory computer-readable media and executable by the at least one processor, the method comprising:
for each of a plurality of simultaneously active online advertisement campaigns:
determining by the at least one processor a set of probability scores corresponding to a plurality of bid request parameters related to online advertisement bid requests based on a set of criteria for the respective online advertisement campaign,
wherein the set of probability scores for the respective online advertisement campaign includes, for each bid request parameter, a range of probability scores indicating a respective desirability of different values for that bid request parameter with respect to the respective online advertisement campaign;
receiving at the at least one processor via a communications network an RTB bid request from an RTB exchange for an online advertisement placement associated with an internet webpage being loaded remotely by a web browser, the RTB bid request having associated values for one or more bid request parameters, and
in real time during the loading of the webpage, the at least one processor:
for each of the plurality of online advertisement campaigns, calculating, during the processing of the received RTB bid request, a combined probability score based on the values for the one or more bid request parameters associated with the RTB bid request and the set of probability scores determined for the respective online advertisement campaign;
for each of the plurality of online advertisement campaigns, determining whether to bid on the online advertisement placement associated with the RTB bid request based at least on the combined probability score calculated for the respective online advertisement campaign and a campaign threshold associated with the respective online advertisement campaign; and returning from the at least one processor to the RTB exchange at least one RTB bid response based on the determination of whether to place a bid on the online advertisement placement for each of the plurality of online advertisement campaigns;
wherein the set of probability scores are calculated prior to receiving the RTB bid request to facilitate the real-time execution of the determination of whether to bid on the online advertisement placement associated with the RTB bid request.

16. The computer-implemented method of claim 15, wherein:
determining by the at least one processor whether to place a bid on the RTB bid request for each of the plurality of online advertisement campaigns comprises determining to place bid on the RTB bid request for each of at least two online advertisement campaigns; and
returning from the at least one processor to the RTB exchange at least one RTB bid response comprises returning from the at least one processor to the RTB exchange an RTB bid response for each of the at least two online advertisement campaigns.

17. The computer-implemented method of claim 15, wherein:
determining by the at least one processor whether to place a bid on the RTB bid request for each of the plurality of online advertisement campaigns comprises:
determining that at least two of the plurality of online advertisement campaigns are suitable for bidding on the RTB bid request; and
applying a set of rules to select one of the at least two online advertisement campaigns to bid on the RTB bid request; and
returning from the at least one processor to the RTB exchange at least one RTB bid response comprises returning from the at least one processor to the RTB exchange an RTB bid response for the selected online advertisement campaign.

18. A computer-implemented real-time bidding (RTB) bidding system, comprising:
a processor and
instructions stored in non-transitory computer-readable media and executable by the processor to perform the steps of:
determining by the processor a set of probability scores corresponding to a plurality of bid request parameters related to online advertisement bid requests based on a set of criteria for an online advertisement campaign for purchasing online advertisements via RTB auctions managed by an RTB exchange,
wherein the set of probability scores includes, for each bid request parameter, a range of probability scores indicating a respective desirability of different values for that bid request parameter with respect to the online advertisement campaign;
during the online advertisement campaign, receiving at the processor via a communications network an RTB bid request from the RTB exchange for an online advertisement placement associated with an internet webpage being loaded remotely by a web browser, the RTB bid request having associated values for one or more bid request parameters, and
in real time during the loading of the webpage, the processor:
calculating, during the processing of the received RTB bid request, a combined probability score based on the values for the one or more bid request parameters associated with the RTB bid request and the set of probability scores;

determining whether to bid on the online advertisement placement associated with the RTB bid request based at least on the calculated combined probability score and a campaign threshold associated with the online advertisement campaign; and in response to determining to bid on the online advertisement placement associated with the RTB bid request, returning from the processor to the RTB exchange an RTB bid response for inclusion in an RTB auction completed during the loading of the webpage;

wherein the set of probability scores are calculated prior to receiving the RTB bid request to facilitate the real-time execution of the determination of whether to bid on the online advertisement placement associated with the RTB bid request.

* * * * *